United States Patent [19]

Franaszek et al.

[11] Patent Number: 5,860,103
[45] Date of Patent: Jan. 12, 1999

[54] METHOD AND APPARATUS USING ADDRESS AND READ HEAD LOCATION INFORMATION TO PROVIDE OPTIMAL OPERATION OF A DISK SYSTEM

[75] Inventors: Peter Anthony Franaszek, Mount Kisco; John Timothy Robinson, Yorktown Heights, both of N.Y.

[73] Assignee: International Business Machines Corporation, Armonk, N.Y.

[21] Appl. No.: 876,727

[22] Filed: Jun. 16, 1997

Related U.S. Application Data

[63] Continuation of Ser. No. 414,409, Mar. 31, 1995, Pat. No. 5,708,793.
[51] Int. Cl.[6] .................................................. G06F 12/00
[52] U.S. Cl. .......................................... 711/133; 711/112
[58] Field of Search ............................. 711/9, 118, 112, 711/133; 395/180, 182.05

[56] References Cited

U.S. PATENT DOCUMENTS

| | | | |
|---|---|---|---|
| 4,467,421 | 8/1984 | White | 711/118 |
| 4,536,837 | 8/1985 | Olson et al. | 707/205 |
| 5,124,987 | 6/1992 | Milligan et al. | 395/182.05 |
| 5,206,939 | 4/1993 | Yanai et al. | 711/4 |
| 5,359,611 | 10/1994 | Parks et al. | 371/40.4 |
| 5,408,644 | 4/1995 | Schneider et al. | 395/180 |

*Primary Examiner*—Tod R. Swann
*Assistant Examiner*—David Laugjahr
*Attorney, Agent, or Firm*—Robert P. Tassinari

[57] ABSTRACT

Minimal random disk write latency is achieved by limiting the number of logical address blocks that can be serviced by a disk to less that the actual number of physically addressable blocks of the system and having a disk controller dynamically map logical data blocks to physical disk blocks in such a fashion that each logical write can take place to any free location, where the free location can be chosen in any track of the current cylinder.

12 Claims, 5 Drawing Sheets

METHOD AND APPARATUS USING ADDRESS AND READ HEAD LOCATION INFORMATION TO PROVIDE OPTIMAL OPERATION OF A DISK SYSTEM

This application is a continuing application of U.S. application Ser. No. 08/414,409, filed Mar. 31, 1995, now U.S. Pat. No. 5,708,793 issued Jan. 13, 1998.

FIELD OF THE INVENTION

The invention relates to data storage systems, and in particular to computer disk storage apparatus.

BACKGROUND OF THE INVENTION

Due to decreasing costs of semiconductor memory, it has become feasible to use relatively large amounts of main memory for file system or disk caches. In some computing environments, quite large read-hit ratios are attained when using such caches, in many cases well over 90%. A typical example of such an environment is interactive single-user computing: after a start-up period in which the programs and data necessary for the work such a user might be doing on a given project are loaded into memory (the "working set"), the programs and data may remain memory-resident for long periods of time. However, due to 1) the high cost of a reliable uninterrupted power supply of sufficient capacity to support a large main memory, and perhaps more importantly 2) the possibility of main memory contents becoming damaged in unpredictable ways due to user errors, operating system errors, application program errors, or computer viruses, it is necessary to write modified blocks out to a non-volatile secondary memory.

It is most cost-effective to use the same secondary memory for 1) loading of programs and data during a start-up period, 2) handling read misses, and 3) as the non-volatile store for writing modified data blocks, i.e., the disk storage as used by the file system. Note that after a start-up period in which a working set is loaded into main memory, the disk will be used primarily to handle random writes. Most current file system designs, however, which originated when main memory was much more expensive and consequently smaller, are not optimized for this kind of disk workload. Rather, they are optimized for sequential reads.

The problem of optimizing a file system for mostly random, write disk access has previously been addressed in the design of log-structured file systems. See, e.g., Rosenblum and Ousterhout, "The design and implementation of a log-structured file system", Proc. Symp. Operating System Principles, 1991. A log-structured file system (LFS) has the problem that it is necessary to periodically reorganize in order to generate new (free) log areas. In Rosenblum the write-cost for a given storage utilization was defined as the average number of blocks accessed for each block written. For reorganization purposes a disk is divided into segments. Suppose segments are of size S blocks, and that all segments have storage utilization u. That is, a segment consists of a number S of physically contiguous blocks, and of these blocks, the number of in use blocks is uS and the number of free blocks is (1–u)S. Then after (1–u)S blocks are written to the log area in the segment, reorganization of the segment will eventually be necessary. Under the "copy and compact" reorganization method, as described in Rosenblum, entire segments are read and then all in-use blocks are written back contiguously. In general, for each segment, this will require S reads (although some of the blocks on a given track in a segment may be free, if any are in-use it is necessary to read the entire track) and uS writes (where the numbers of reads and writes are given as numbers of blocks). It follows that the write cost (as defined in Rosenblum) under these simplifying assumptions is $$1 + \frac{1+u}{1-u} = \frac{2}{1-u}.$$

A somewhat less expensive reorganization method is to select a source area to clean and a target area to which in-use blocks from the source will be moved (this avoids reading and then writing the same tracks). The inventors of the present invention have discovered that a similar simplified analysis for this method gives a write cost of $$1 + \frac{1}{1-u} = \frac{2-u}{1-u}.$$

Simulations show that in practice these write costs imposed by reorganization are worst-case results: improvements can be obtained by, for example, selecting the least utilized segments to clean (the above write-costs are called "no variance" write costs since it is assumed that all segments have the same storage utilization). However, the resulting write cost curves still have the same shape, and tend to climb sharply above 60% storage utilization. The no-variance write costs, and write costs generated by simulations (developed by the present inventors) in which the least utilized segments are chosen for reorganization, are shown in FIG. 4.

The only related method for handling disk writes of which we are aware is the write-ahead-dataset (WADS) method used by the Information Management System, (IMS), (see Strickland, Uhrowczik, and Watts, "IMS/VS: an evolving system", 21 IBM Systems Journal No. 4 (1982), pp. 490–510). An IMS WADS is a temporary location in which log records are stored. It requires a specially formatted count-key-data architecture type disk in which tracks are set up with records in which all keys are zero. Special channel programs are used in which a "search for key=0" command precedes the write. Since all records have a zero key this results in the write taking place to the first record to reach the disk head, minimizing rotational latency. However: 1) only one in-use record can be stored per track, 2) there does not seem to be any way to extend this to write to the first record on any track, and 3) records are only stored temporarily (since the method can only use a fraction of the disk space), and are re-written to other "ordinary" data sets as soon as it is convenient, which logically frees the corresponding WADS records (and associated tracks).

In contrast, the present invention, described below, always has a write cost of one, and for a typical small systems disk architecture in which there are 14 tracks per cylinder and 64 K-byte blocks per track, the disk write latency is less than one-sixth of a disk rotation for storage utilizations up to 90%.

Thus, the present invention provides a method and system for optimizing sequential reads.

SUMMARY OF THE INVENTION

In the current invention the problem of optimizing the disk for a random write workload is solved by 1) maintaining a mapping of logical to physical blocks within the disk controller, 2) allowing logical disk writes to take place to any free physical disk location, and 3) choosing such a disk location so as to minimize latency and maintain similar utilization over all cylinders.

FIGURES

DETAILED DESCRIPTION

Figure 1:
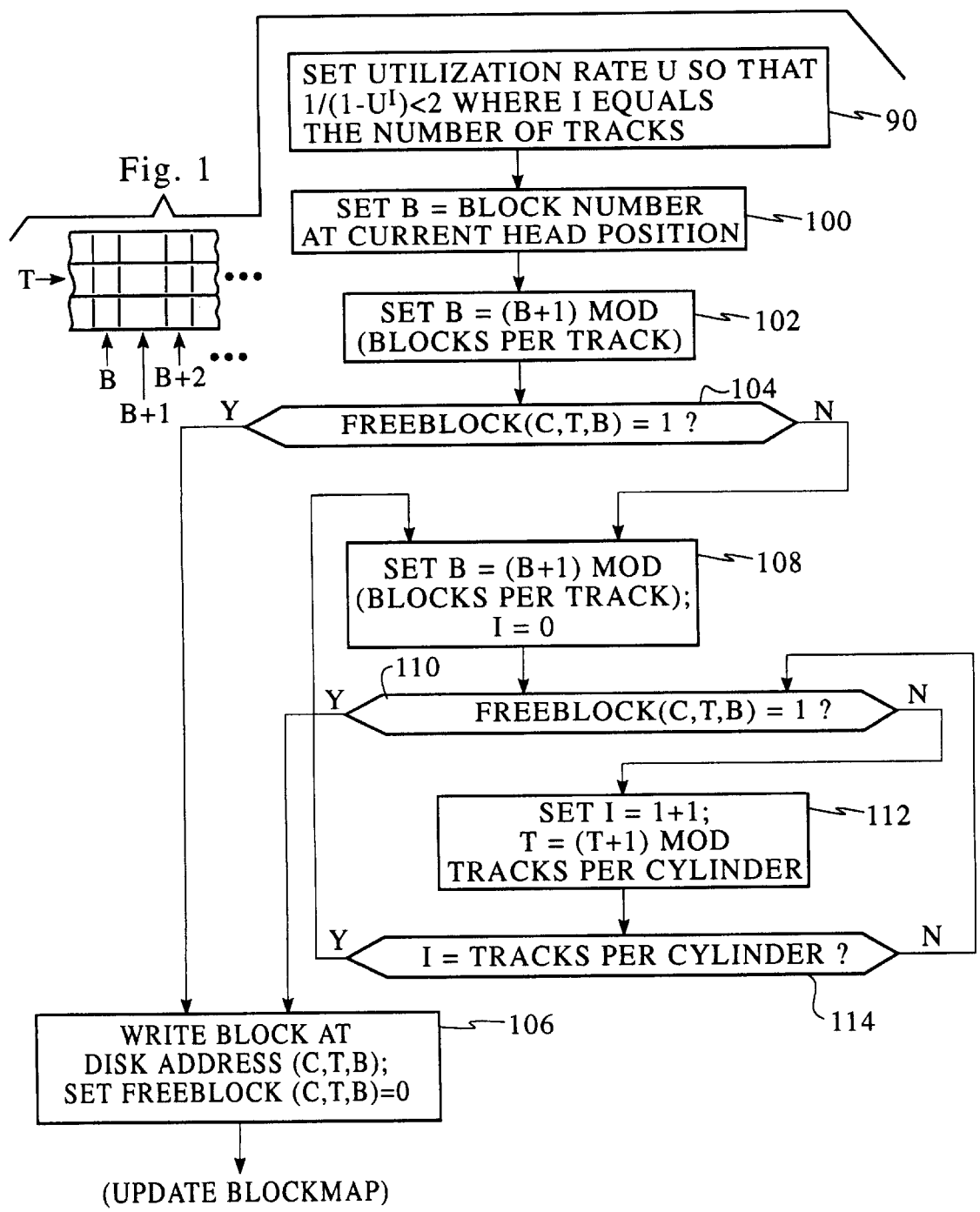
FIG. 1 is a flow chart describing the method of the present invention.

It is convenient to describe the invention in terms of a specific disk drive and specific data structures, although of course it should be recognized by those skilled in the art that this design generalizes in straightforward ways to any other disk design. In particular, a preferred embodiment of the invention will be discussed assuming a typical small system disk drive is used having 949 cylinders, 14 tracks per cylinder, and 48 512-byte sectors per track (supporting 64 K-byte blocks per track). It is also assumed that track skew is 4 sectors, thus it is possible to switch to any track in the time taken for half of a block to move past a disk head.

In order to write a disk block to any free location, it will be necessary for the disk control unit to maintain a free block map along with a mapping of logical disk block IDs to physical locations (this latter map is necessary since the physical location of a given logical block will not be determined until the write request arrives at the control unit). Assuming a byte-addressable control unit store, these can be implemented as: 1) a 949×14 "FreeBlock" array of bytes, where the first six bits of each byte indicate whether the corresponding block is in use on a given track and cylinder (the remaining bits could be used, for example, to mark bad tracks); and 2) a "BlockMap" array of length floor (0.9*6*14*949), i.e., 71,744, of 4-byte words, where in word B the first 10 bits specify the cylinder, the next 4 bits the track, and the next 3 bits the block number on the track of the block with logical block number B (the remaining 15 bits are reserved, for use for example as a timestamp, as a process ID for protection, for recovery information, etc.). The number of logical block IDs is limited to 90% of the number of physical blocks for reasons explained below.

It is assumed that blocks are written in a self-identifying manner (that is, a prefix or a suffix with the logical block ID is written possibly along with other information). However, to speed start-up the FreeBlock and BlockMap arrays should be non-volatile. This should not be very expensive as battery power for only 293.23 KBytes of memory is required for the particular disk described in this example.

In accordance with the present invention, a write request is handled as follows:

1) determine the current head position;

2) if the next block location on the current track is free, then 2.1) schedule the write to this location, otherwise 2.2) taking into account track skew, find the next free block that could be written on any track in the current cylinder, initiate switching to this track, and schedule the write to this location;

3) on write completion, update FreeBlock (the old physical location of the logical block is now free and the new location is now in-use), update BlockMap, and signal write completion to the host;

4) if the storage utilization of the current cylinder exceeds the overall disk storage utilization (both maintained dynamically) by a given threshold, initiate a seek to the next cylinder in the current direction, unless the last cylinder in the current direction has been reached in which case switch the current direction.

A read request is handled by finding the physical location of the block in BlockMap, followed by a seek (if necessary), etc., and reading the block.

Figure 5:
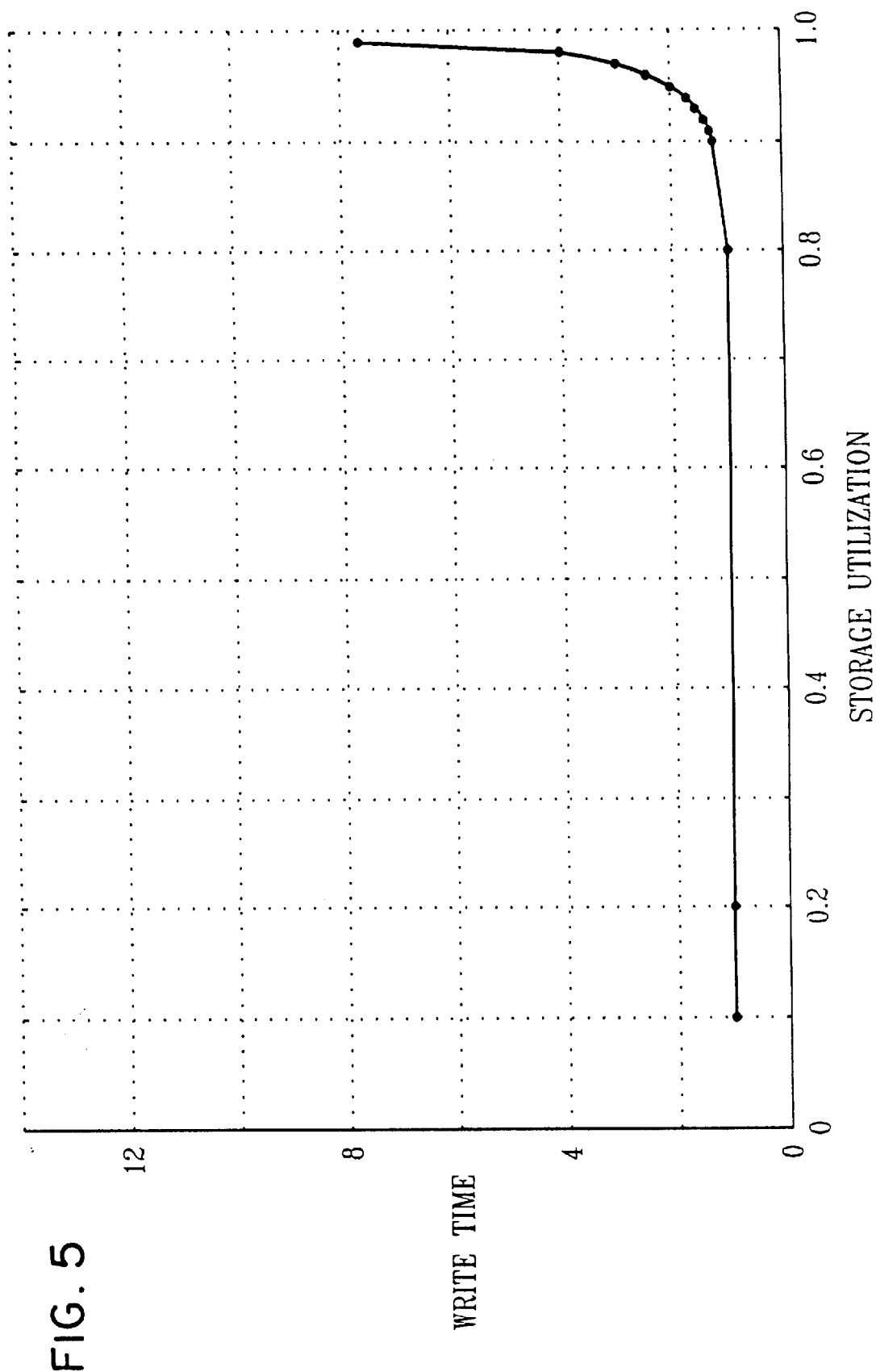
FIG. 5 is a plot of storage utilization vs. write time for the method of the present invention.

In the above method, clearly the write cost is always one. This may be somewhat misleading, however, since some number of blocks may have to be skipped over in order to find a free location. A better measure is expected latency, in terms of number of blocks (where six blocks=one disk rotation). Suppose storage utilization is u, and that in-use blocks are distributed randomly around the disk (note that the method for handling writes above guarantees this by keeping storage utilization relatively constant over all cylinders). A given "vertical stripe" of blocks on a cylinder consists of 14 blocks (one for each track), and the probability that all are in-use is $u^{14}$. Therefore at least one is free with probability $1-u^{14}$. Using a simplified analysis, a write time of one block is required if the next block on any track is free, a write time of two blocks is required if this isn't the case but the next "vertical stripe" has a free block, etc. Therefore the expected write time is $$1x(1-u^{14}) + 2xu^{14}(1-u^{14}) + 3x(u^{14})^2(1-u^{14}) + \ldots = \frac{1}{1-u^{14}},$$

where in order to obtain a simple expression for the answer the infinite series (which converges rapidly for u<1) has been summed (instead of only using six terms). This write time function of storage utilization u, which can more directly be compared with the write cost of a LFS, is shown in FIG. 5. Note from FIG. 5 that with I=14 by limiting storage utilization u to at most 90%, (by setting the logical block ID space to 90% of the physical space), an expected write-time close to one block is guaranteed and that with storage utilization less than 95, $1/1-U^{14}$ or the expected write time is less than 2.

Figure 2:
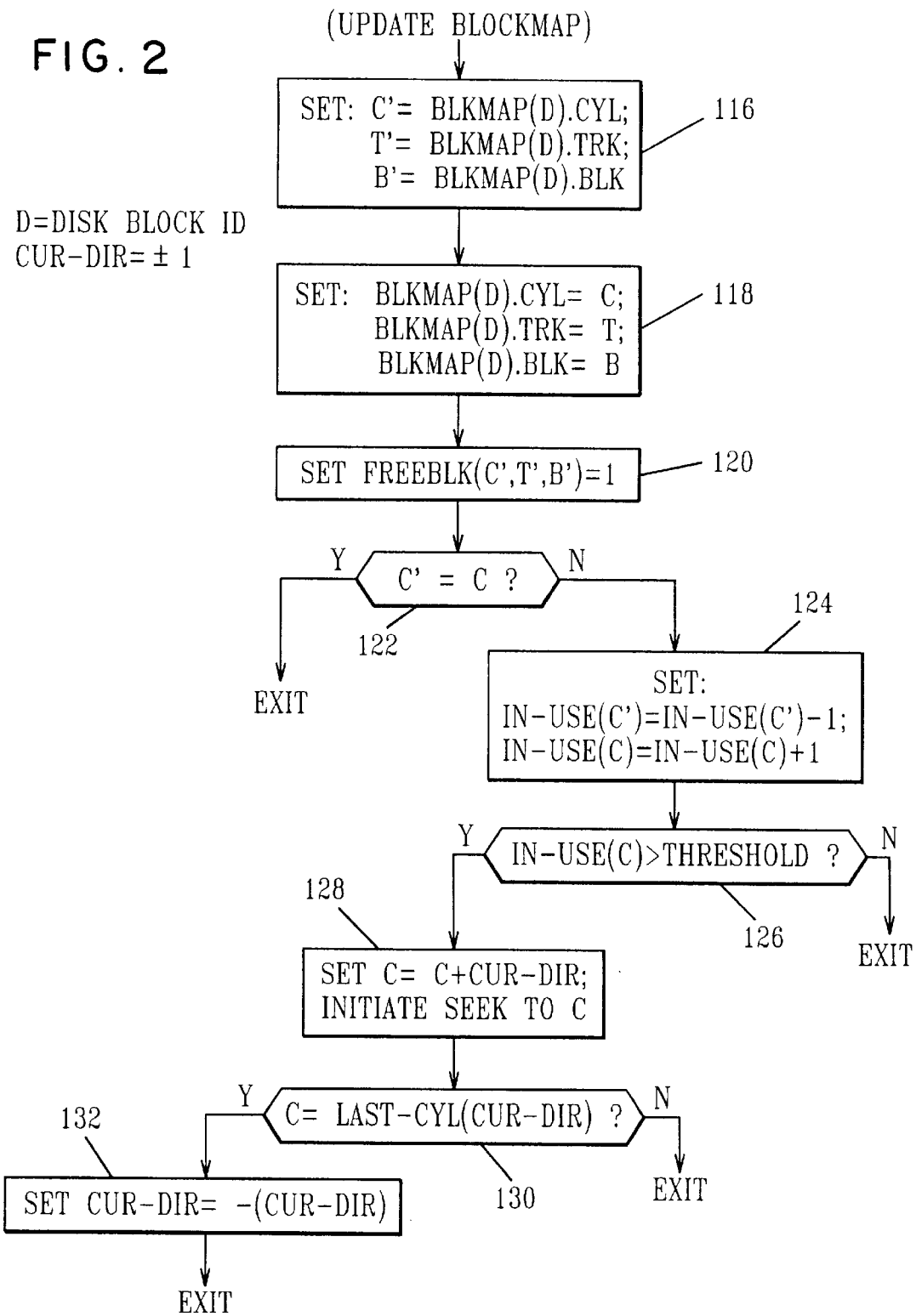
FIG. 2 is a continuation of the flow chart of FIG. 1.

The invention can be implemented as disk control unit microcode, in accordance with the procedure shown in FIGS. 1 and 2, and described as follows. Let C equal the current cylinder number, in the range of 0 to (N−1) where N is the total number of cylinders. Let T equal the current track number, in the range of 0 to (M−1) where M is the number of tracks per cylinder.

In the event (although unlikely) that all blocks in the current cylinder C are in use, there will be no free block to write to in the following steps. In this case, a new cylinder C' with some number of free blocks would be determined, a seek initiated to C', and C set to C'.

Established a threshold limitation as set forth in step 90. At step 100 of the procedure, set B equal to the block number of the current read/write head position. At step 102, set B=(B+1) mod (blocks per track). This operation sets B equal to the block address of the next block to be encountered by the read/write head. At step 104, it is determined whether Freeblock(C,T,B)=1. That is, it is determined whether block number B in track T, cylinder C, is free. If so, data is written to the disk at this location in step 106, and Freeblock(C,T,B) is set to zero. If not, then in step 108 the value of B is set to equal (B+1)mod(blocks per track); and the term I is set to zero, where I will be used to accumulate the number of tracks examined. Next at step 110, it is again determined whether Freeblock (C,T,B)=1. If so, then write to the block (C,T,B), step 106. If not, set I=I+1; and set T equal to (T+1)mod(tracks per cylinder), step 112. At step 114, it is determined whether I equals the number of tracks per cylinder. That is, iL is determined whether the last block in the current track has been examined. If so, return to step 108; if not, return to step 110.

After data has been written to a free block, step 106, the block map is updated. At step 116, FIG. 2,
set C'=Blkmap(D).CYL;
T'=Blkmap(D).TRK;
B'=Blkmap(D).BLK.
Where D is the block ID and C', T' and B' are the former cylinder, track and block of the data, respectively. Next, in step 118,
set Blkmap(D).CYL=C;
Blkmap(D).TRK=T;
Blkmap(D).BLK=B.
This sets the new location of the block with logical ID D to (C,T,B). Next, in step 120, set FREEBLK(C',T',B')=1. That is, designate block B' of cylinder C', track T' as being free. In step 122, it is determined whether C'=C, that is, whether the new cylinder is the same as the old cylinder. If so, exit the program. If not, proceed to step 124 and
set IN-USE(C')=IN-USE(C')−1;
IN-USE(C)=IN-USE(C)+1.
Next, in step 126, it is determined whether IN-USE(C) >Threshold (where Threshold is a design parameter reflecting a desired maximum number of in use blocks per cylinder). If not, exit the program (because the system is below target utilization). If so, proceed to step 128, where C is set to C+CUR-DIR, and a seek to C is initiated. Next, at step 130, determine if C=LAST-CYL(CUR-DIR) (i.e., whether the last cylinder in a particular direction has been reached. This will be indicated, e.g., by a value of LAST-CYL(CUR-DIR)=1 or−1.). If not, exit the program. If so, at step 132, set CUR-DIR=−(CUR-DIR), and then exit.

Figure 3:
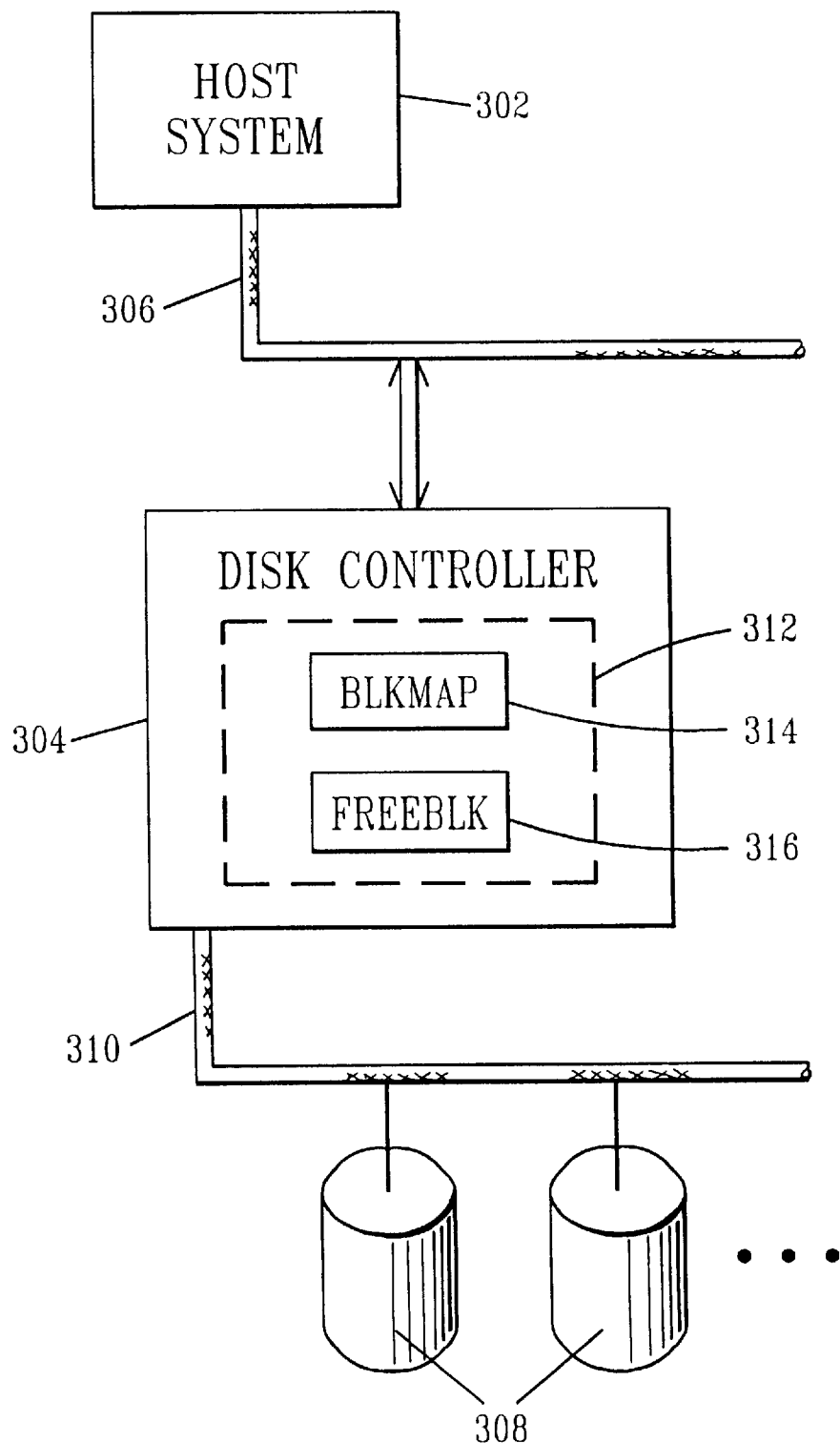
FIG. 3 is a block diagram of a preferred system for carrying out the method of the invention.
Figure 4:
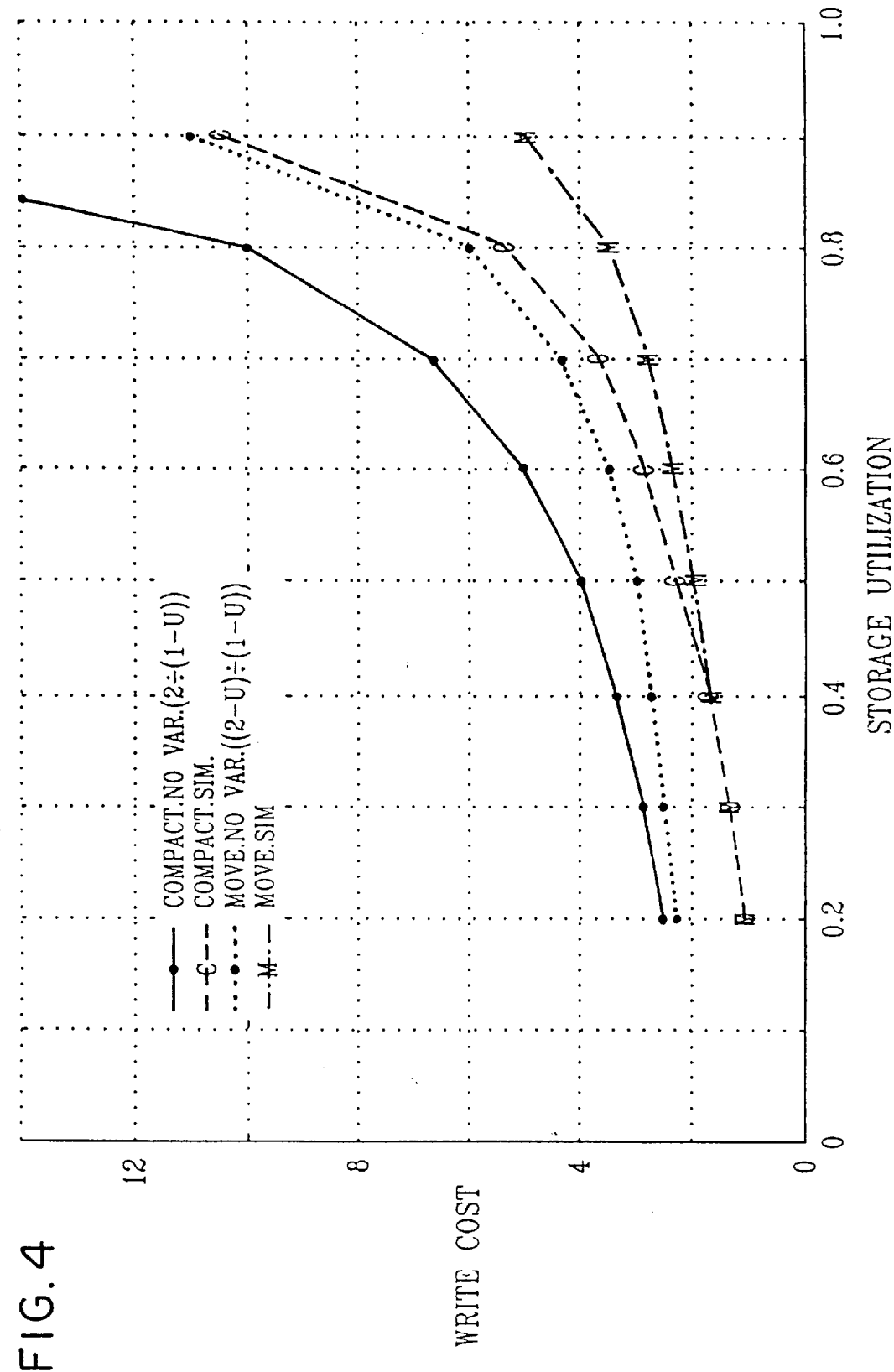
FIG. 4 is a plot of storage utilization vs. write cost for Log Structured File System-based reorganization techniques.

Referring now to FIG. 3, a preferred system in accordance with the invention will be described. FIG. 3 shows a host system 302, coupled to a disk controller 304 via bus 306. Disk controller 304 is, in turn, coupled to one or more storage disks 308 via bus 310. Disk controller 304 includes a non-volatile, random access memory unit 312, which, in turn, comprises tables BLKMAP 314 and FREEBLK 316. writes to and reads from tables 314 and 316 are controlled by the host system in accordance with the process steps explained in detail above.

While the invention has been described particularly with respect to preferred embodiments thereof, it will be understood that modifications to the disclosed embodiments can be effected without departing from the spirit and scope of the invention.

We claim:

1. A computer system comprising;
a) a host system;
b) a disk system with a plurality of cylinders each having a plurality of tracks T with each track containing a plurality of blocks arranged in stripes within each cylinder, where the blocks in use in a cylinder are randomly distributed and have a utilization level U that results in $1/1-U^I$ being <2 where I is the number of tracks in that cylinder; and
c) logic means for controlling entry of data in said disk system including:
i) records means to determine the cylinder C, track T and physical block B location that is being accessed and if the next location B+1 on track T or any other track is free;
ii) write control means for controlling the writing of an updated version of data at location C', T', B' into the next physical block location B+1 if it is indicated as being free and write said updated version into physical block location B+1 in another track in the same cylinder C if block B+1 on said another track is indicated as being free and location C, T, B+1 is not free; and
iii) update means to indicate as free the location C', T', B' of the data that has been updated to maintain utilization of actual storage locations in the disk system substantially at U or below.

2. The computer system of claim 1 wherein said record means includes table means indicating usage and non-usage of block locations in said disk system.

3. The computer system of claim 1 wherein said disk system includes more physically addressable block locations than logical block addresses.

4. The computer system of claim 1 wherein said write control means includes means for storing said data in any block B+2 in cylinder C if no physical block location B+1 in any track of cylinder C is free.

5. The computer system of claim 4 wherein said write control means includes means for:
storing data in another free block address in cylinder C if no physical block location B+2 in cylinder C is free; and
if no free block is found in cylinder C going to the next cylinder C".

6. A computer system comprising;
a) a host system;
b) a disk system with a plurality of cylinders C each containing a plurality of tracks T with each track containing a plurality of physical block locations B for storing blocks of data which block locations are arranged in stripes each stripe containing a block location of a different track of a cylinder which disk system has means establishing a utilization level U that limits the number of used logical block location addresses for each cylinder in the disk system to less than the actual number of physical block locations that are addressable in that cylinder of the disk system;
c) means for performing a write operation for updated data at the next free physical block location in the following sequence:
i) if the next block location in any track of the current cylinder is the next free block location writing the updated data in the next block using a write time of one block; and
ii) if the next free block location in the current cylinder is not in the next block location in any track of the current cylinder but is in the next stripe, writing the data in the next stripe using a write time of two blocks.

7. The computer system of claim 6 wherein $1/1-U^I$ is less than two where U is the ratio of the number of logical block location addresses to the number of addressable physical block locations and I is the number of tracks in the current cylinder.

8. The computer system of claim 7 including:
means for checking the current cylinder to determine if the current cylinder utilization exceeds a predetermined ratio; and
means for seeking a free block in the next cylinder if that ratio is exceeded.

9. The computer system of claim 8 including table means maintaining a list of physical block locations in use and of physical block locations indicated as free.

10. In a computer system including a host system and a disk system with a plurality of cylinders C each containing a plurality of tracks T with each track containing a plurality of physical block locations B for storing blocks of data which locations are arranged in stripes each stripe containing a block location of a different track of the cylinder, means for controlling the location of stored data comprising:

- a) means maintaining the number of physical blocks in use at a desired utilization level U of a cylinder that results in $1/1-U^I$ being <2 where I is the number of tracks in the cylinder;
- b) means for distributing data in logical block locations at random addressable physical block locations;
- c) means taking into account track skew, for finding the next free physical block location from the current track head position;
- d) means for performing a write operation for updated data at the next free physical block location in the following sequence:
    - i) if the next block location in any track of the current cylinder is the next free block location, writing the updated data in that next block using a write time of one block; and
    - ii) if the next free block location in the current cylinder is not in the next block location in any track of the current cylinder but is in the next stripe, writing the data in the next stripe using a write time of two blocks; and
- e) means for indicating as free the previous block location of the data written into the next free physical block location.

11. The computer system of claim 10 including:

- f) means for checking the current cylinder to determine if the current cylinder utilization exceeds a predetermined ratio; and
- g) means for seeking a free block in the next cylinder if that ratio is exceeded.

12. In the computer system of claim 10 including:

means for maintaining a list of physical block locations in use and of physical block locations indicated as free.

* * * * *